(12) United States Patent
Medl et al.

(10) Patent No.: US 7,015,855 B1
(45) Date of Patent: Mar. 21, 2006

(54) CREATING AND IDENTIFYING SYNTHETIC APERTURE RADAR IMAGES HAVING TILT ANGLE DIVERSITY

(75) Inventors: Thomas E. Medl, Litchfield Park, AZ (US); James H. Hughen, Orlando, FL (US); Russell N. Van Allen, Melbourne, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/204,335

(22) Filed: Aug. 12, 2005

Related U.S. Application Data (60) Provisional application No. 60/600,856, filed on Aug. 12, 2004.

(51) Int. Cl.
*G01S 13/90* (2006.01)
*G01S 7/41* (2006.01)
*G06K 9/62* (2006.01)

(52) U.S. Cl. ............... 342/25 A; 342/25 R; 342/25 F; 342/73; 342/74; 342/75; 342/81; 342/89; 342/90; 342/175; 342/195; 382/100; 382/103

(58) Field of Classification Search .... 342/25 R–25 F, 342/89, 90, 175, 189–197, 73–81; 382/100, 382/103
See application file for complete search history.

(56) References Cited

U.S. PATENT DOCUMENTS

| | | | | |
|---|---|---|---|---|
| 4,527,161 A | * | 7/1985 | Wehner | 342/196 |
| 4,562,439 A | * | 12/1985 | Peralta et al. | 342/81 |
| 4,723,124 A | * | 2/1988 | Boles | 342/25 C |
| 4,855,747 A | * | 8/1989 | Steinberg | 342/194 |
| 5,262,781 A | * | 11/1993 | Evans | 342/25 F |
| 5,497,158 A | * | 3/1996 | Schmid et al. | 342/90 |
| 5,731,780 A | * | 3/1998 | Bleijerveld | 342/75 |
| 6,088,295 A | * | 7/2000 | Altes | 342/25 A |
| 6,337,654 B1 | * | 1/2002 | Richardson et al. | 342/90 |
| 6,714,157 B1 | * | 3/2004 | Wittenberg | 342/191 |

OTHER PUBLICATIONS

Kim, Seong , et al., "Low Cost Ka Band SAR/SAR for UAV Applications", *IEEE Aerospace Conference Proceedings*, vol. 2-1097, Dec. 9, 2002), 1-6.

Medl, Tom , et al., "Application of SAR fundamental angles to ISAR and moving target imaging problems", *Algorithms for Synthetic Aperture Radar Imagery XI, SPIE Defense and Security Symposium*, Orlando, Florida, (2004), 74-89.

Medl, Tom , et al., "New explanation of relative motion in ISAR and moving target imaging problems from a target-centric viewpoint using SAR fundamental angles", *Algorithms for Synthetic Aperture Radar Imagery XI, SPIE Defense and Security Symposium*, Orlando, Florida,(2004), 90-101.

* cited by examiner

*Primary Examiner*—Bernarr E. Gregory
(74) *Attorney, Agent, or Firm*—Jeffrey D. Myers; Peacock Myers, PC (57) ABSTRACT

An apparatus for and method of employing synthetic aperture radar (SAR) images to automatically classify a target comprising emitting and collecting SAR signals at a plurality of squint angles, forming a plurality of SAR images of the target from the collected signals, the plurality of SAR images substantially having tilt angle diversity, automatically classifying the target from each of the plurality of SAR images, and generating a most probable target classification from the classifications of the plurality of SAR images.

20 Claims, 7 Drawing Sheets

CREATING AND IDENTIFYING SYNTHETIC APERTURE RADAR IMAGES HAVING TILT ANGLE DIVERSITY

CROSS-REFERENCE TO RELATED APPLICATIONS

This application claims priority to and the benefit of the filing of U.S. Provisional Patent Application Ser. No. 60/600,856, entitled "Creating and Identifying Synthetic Aperture Radar Images Having Tilt Angle Diversity", filed on Aug. 12, 2004, and the specification and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to creating and automatically identifying synthetic aperture radar images.

2. Description of Related Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

Synthetic Aperture Radar (SAR) images are two-dimensional (2D) projections of scattering centers from a three-dimensional (3D) target. Use of such images in automated target detection and classification is known, as described in, for example, MedI and Hughen, "Application of SAR Fundamental Angles to ISAR and Moving Target Imaging Problems", *Algorithms for Synthetic Aperture Radar Imagery XI*, SPIE Defense and Security Symposium, Orlando, Fla., 2004; MedI and Hughen, "New Explanation of Relative Motion in ISAR and Moving Target Imaging Problems from a Target-centric Viewpoint Using SAR Fundamental Angles", *Algorithms for Synthetic Aperture Radar Imagery XI*, SPIE Defense and Security Symposium, Orlando, Fla., 2004; Kim, Pergande, and Hughen, "Low Cost Ka Band SAR/ISAR for UAV Applications", IEEE Aerospace Conference Proceedings, 2003; and Jakowatz, et. al., *Spotlight-mode Synthetic Aperture Radar: A Signal Processing Approach*, Kluwar Academic Publishers, Norwell, Mass., 1996.

When a highly maneuverable vehicle, such as an unmanned aerospace vehicle (UAV) or a missile, is used to create the SAR image, it is possible to obtain "tilt angle diversity" on a target. In other words, multiple SAR images can be taken of a vehicle, each one having a different 2D projection of the 3D target. In the prior art such tilt angle diversity is considered an obstacle to correct target classification. However, the present invention uses this diversity as an aid to correct target classification.

With the present invention, each image can be identified individually and decisions can be fused together by post-processing algorithms. This process increases the probability of correct identification/classification of a target by fusing multiple decisions together from diverse SAR images. The tilt angle is one angle that describes the intersection of the SAR projection plane (i.e., slant plane or range-doppler plane) with the target body. For applications such as range-doppler imaging, having tilt angle diversity has been considered a problem or a nuisance. It has not heretofore been considered that tilt angle diversity could be beneficially employed.

The present invention employing tilt angle diversity increases the probability of correct identification/classification ($P_{cc}$) of the target as against a single image. If the $P_{cc}$ of a "single look" is lowered in the "multilook" system of the present invention, it becomes possible to relax the cross-range resolution requirements, thus decreasing the single look integration time and the CPU memory and throughput requirements of the image formation processor (computer hardware executing software embodying the invention). The signal-to-noise (SNR) ratio of the system could also be lowered, permitting a lower powered, cheaper, and lighter radar system component of the invention.

BRIEF SUMMARY OF THE INVENTION

The present invention is of an apparatus for and method of employing synthetic aperture radar (SAR) images to automatically classify a target, comprising: emitting and collecting SAR signals at a plurality of squint angles; forming a plurality of SAR images of the target from the collected signals, the plurality of SAR images substantially having tilt angle diversity; automatically classifying the target from each of the plurality of SAR images; and generating a most probable target classification from the classifications of the plurality of SAR images. In the preferred embodiment, the increment between tilt angles for successive SAR images is at least approximately 1 degree (most preferably at least approximately 8 degrees and wherein the plurality of SAR images numbers at least seven). A flight platform carries the SAR emitter and collector and preferably performs at least approximately a 90 degree turn about a stationary target during operation. The SAR emitter and collector operates in one or more electromagnetic radiation bands, preferably selected from millimeter wave and X band, and most preferably including the millimeter wave electromagnetic radiation band. Generating preferably comprises employing a Bayes probabilistic combining technique and/or a correlation plane peaks accumulation technique.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The present invention is of a method and apparatus for employing synthetic aperture radar (SAR) images to automatically classify a target by emitting and collecting SAR signals at a plurality of squint angles, forming a plurality of SAR images of the target from the collected signals, the plurality of SAR images substantially having tilt angle diversity, automatically classifying the target from each of the plurality of SAR images, and generating a most probable target classification from the classifications of the plurality of SAR images.

By intentional vehicle maneuvering, one can get an estimate of a stationary (or a non-maneuvering moving) target's 3D shape by successive diverse 2D SAR projections. For example, a first image can focus on target length vs. width while a second image focuses on target height vs. length. One preferably uses an estimate of target position to plan a flight path to the target to get the desired diverse 2D SAR projections of the target. The invention collects SAR data using different line-of-sight (LOS) squint angles (beam agility), forms multiple SAR images with tilt angle diversity, identifies each SAR image, and fuses identification decisions from each look to get a combined identification.

Note that "squint angle" as used in the specification and claims is the angle between the LOS vector from the invention platform to the target and the velocity vector of the platform.

"Image formation processor" is any hardware/software combination employed to generate SAR images from incoming SAR signals.

"Image identification processor" is any hardware/software combination employed to classify an element of a single SAR image, which preferably employs artificial intelligence techniques including but not limited to neural networks, fuzzy logic, genetic algorithms, Bayesian classification, and like techniques known to those of ordinary skill in the art, now or in the future.

"Image classification processor" is any hardware/software combination employed to classify an element of multiple SAR images based upon output from the image identification processor, which image classification processor preferably employs artificial intelligence techniques including but not limited to neural networks, fuzzy logic, genetic algorithms, Bayesian classification, and like techniques known to those of ordinary skill in the art, now or in the future.

Figure 1:
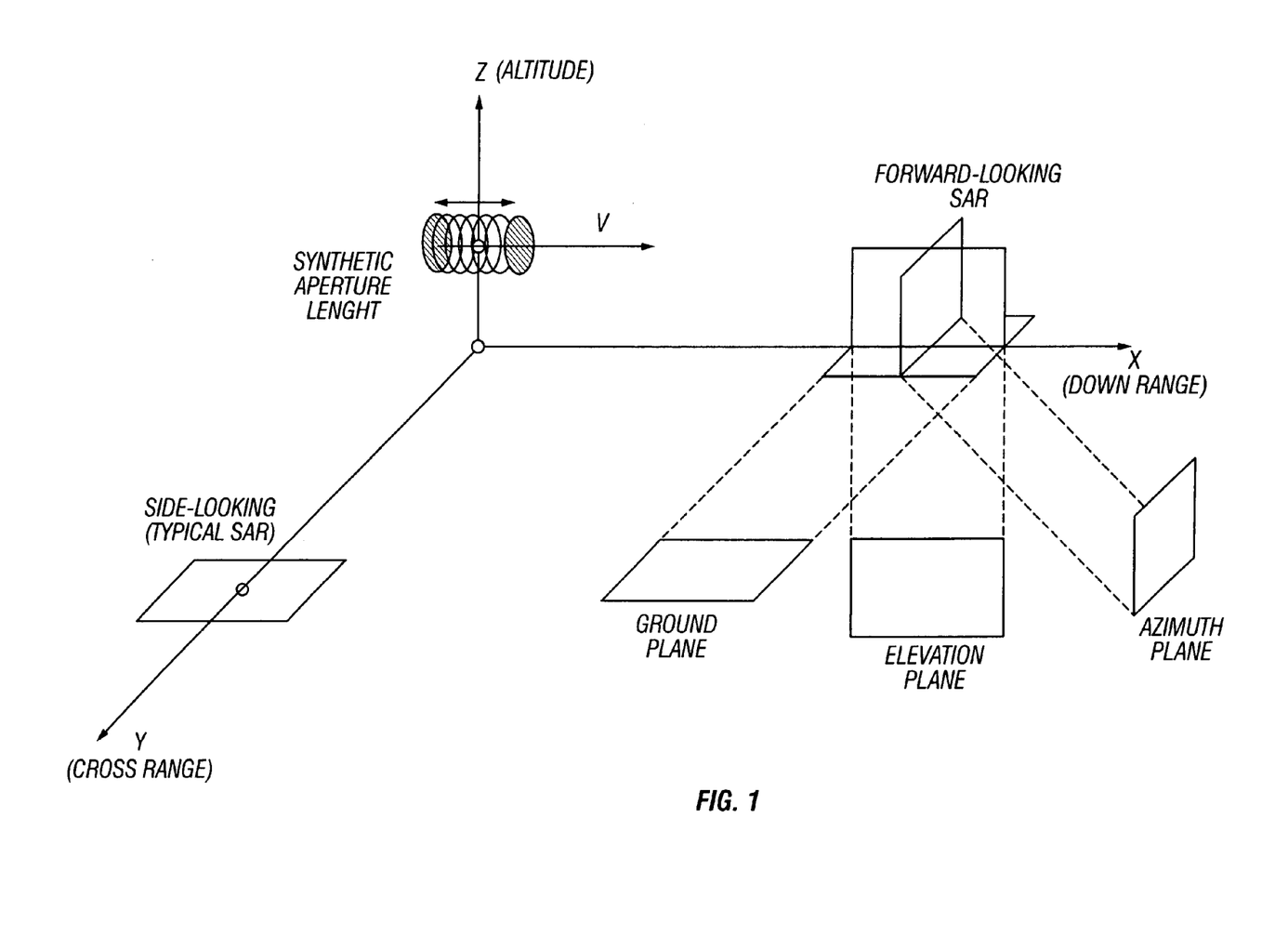
FIG. 1 illustrates operation of side-looking and forward-looking SAR.
Figure 2A:
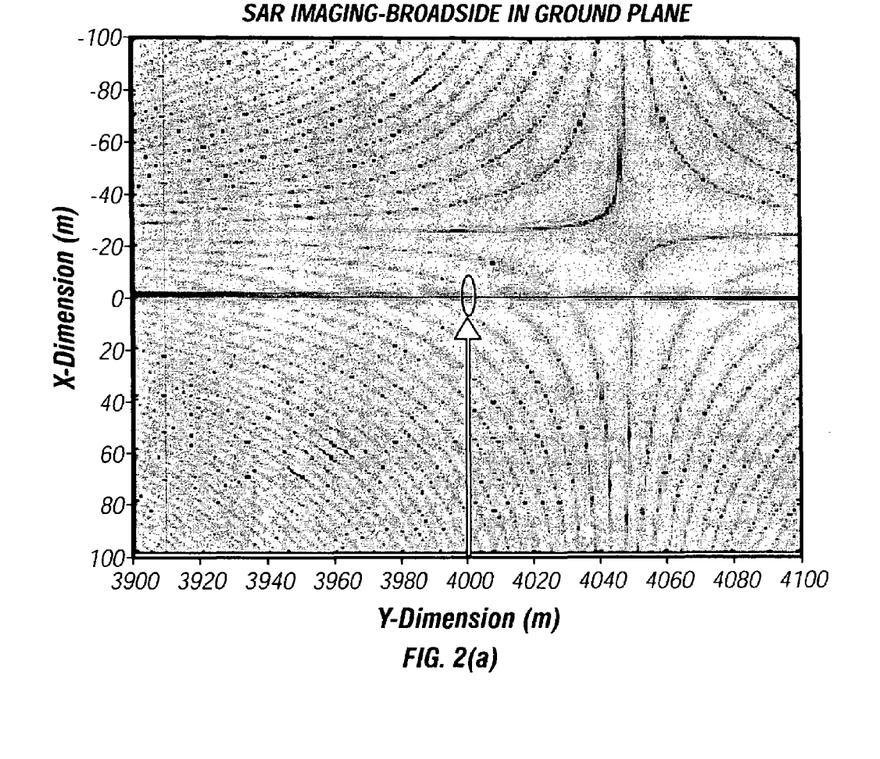
FIGS. 2(a) and 2(b) illustrate the principal effectiveness of side-looking SAR in the azimuth direction (broadside look in ground plane) and the concomitant areas of ineffectiveness.
Figure 2B:
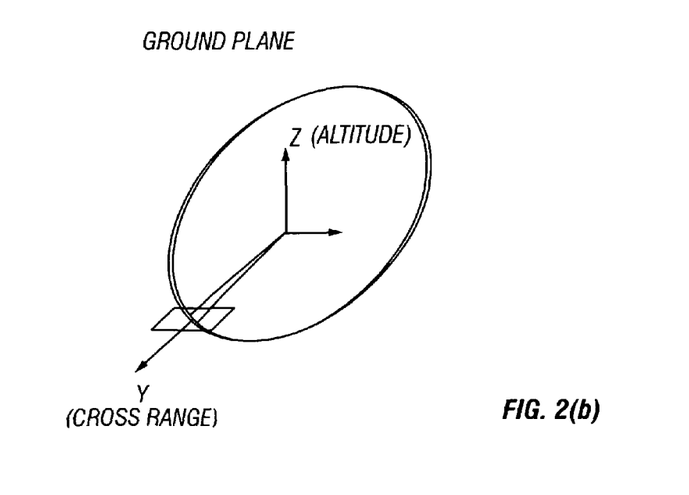
Figure 3A:
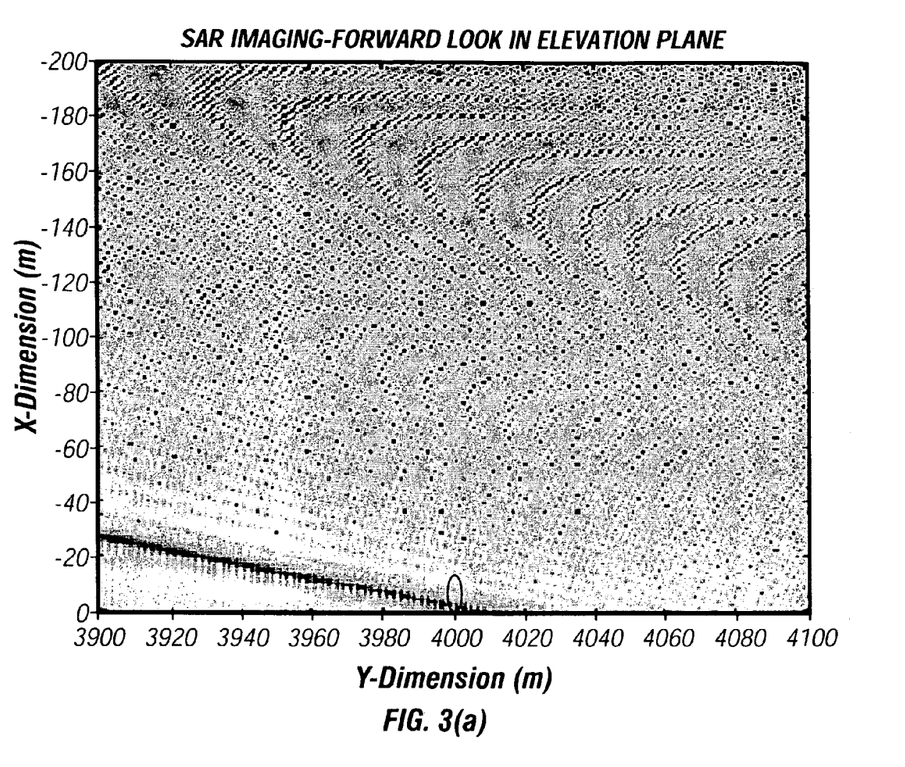
FIGS. 3(a) and 3(b) illustrate the principal effectiveness of forward-looking SAR in the elevation direction (forward look in elevation plane) and the concomitant areas of ineffectiveness.
Figure 3B:
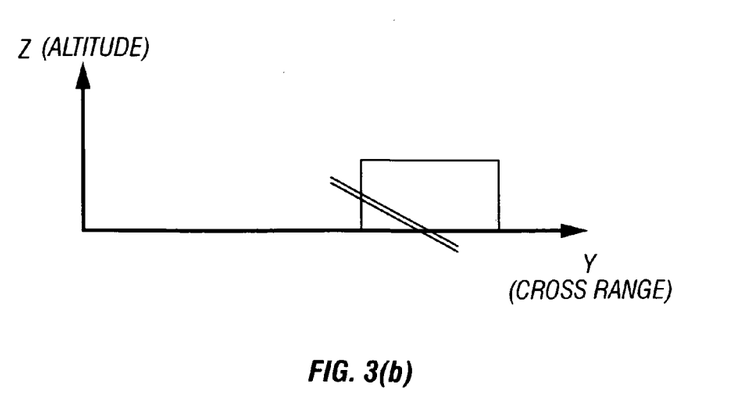

FIG. 1 illustrates the two types of SAR imaging geometries (side-looking and forward-looking) and the planes formed by a target with respect to the SAR emitter/receiver. FIGS. 2(a) and 2(b) illustrate that for side-looking SAR the highest doppler resolution is in the azimuth direction, and FIGS. 3(a) and 3(b) illustrate that for forward-looking SAR the highest doppler resolution is in the elevation direction. In both cases, images targets located in particular locations with respect to the SAR emitter/receiver are substantially smeared.

Figure 4:
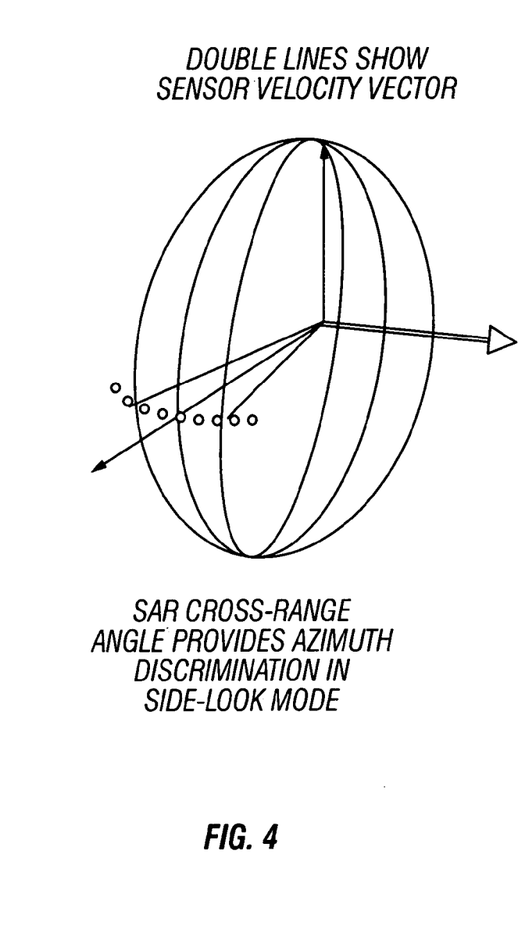
FIG. 4 illustrates provision of azimuth discrimination with a plurality of side-looking SAR cross-range angles.
Figure 5:
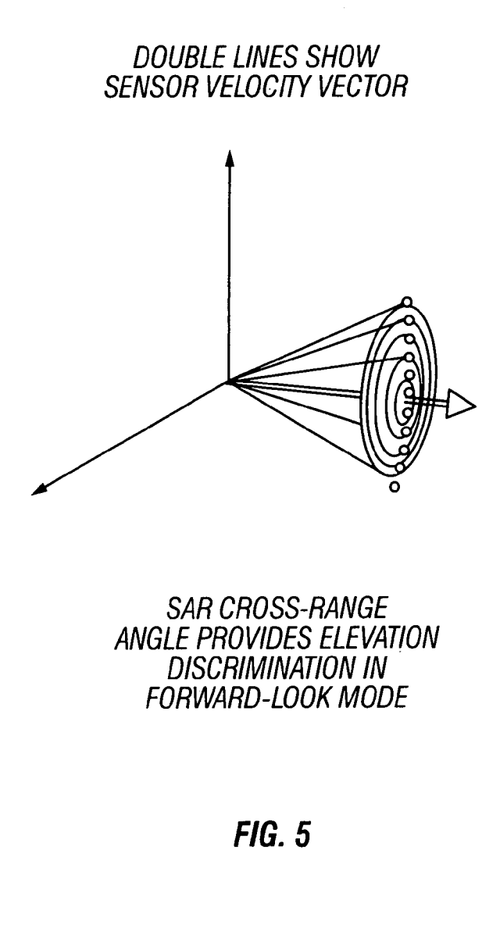
FIG. 5 illustrates provision of elevation discrimination with a plurality of forward-looking SAR cross-range angles.

FIG. 4 illustrates that achieving diverse cross-range angles with multiple side-looking SAR images will provide good azimuth discrimination of a target. Concomitantly, FIG. 5 illustrates that achieving diverse cross-range angles with multiple forward-looking SAR images will provide good elevation discrimination of a target.

Figure 6:
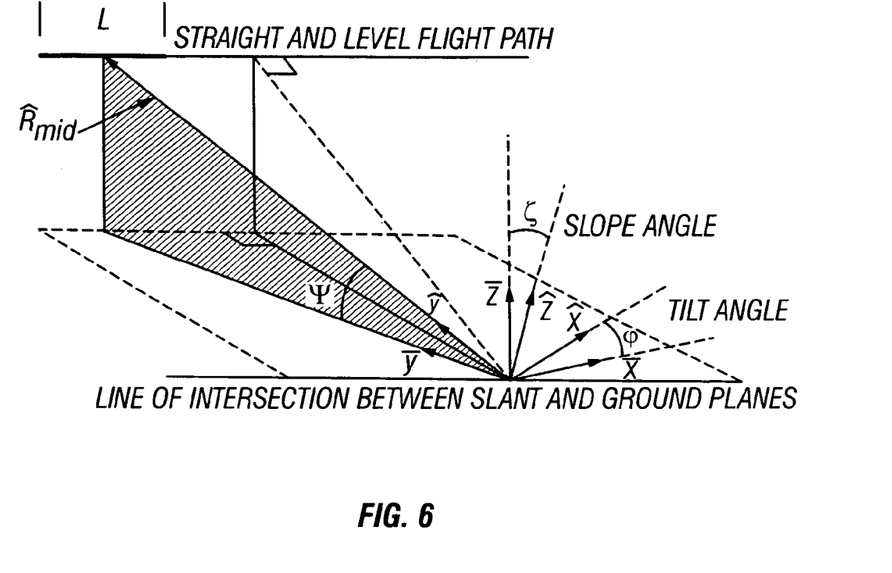
FIG. 6 illustrates the relationship between ground-plane vectors (barred vectors) and slant-plane vectors (hat vectors)

FIG. 6 illustrates the relationship between slope and ground planes for x, y, and z directions. The bar vectors in the diagram refer to such directions in the ground plane, and the hat vectors to such directions in the slant plane. The angle between $\bar{z}$ and $\hat{z}$ is referred to as the slope angle, and that between $\bar{x}$ and $\hat{x}$ is referred to as the tilt angle. As understood by one of ordinary skill in the art, appropriate compensation can be made between SAR images having tilt angle diversity because $\cos\phi \cdot \cos\Omega = \cos\zeta$, where $\phi$ is the tilt angle, $\psi$ is the angle between $\bar{y}$ and $\hat{y}$, and $\zeta$ is the slope angle.

Figure 7:
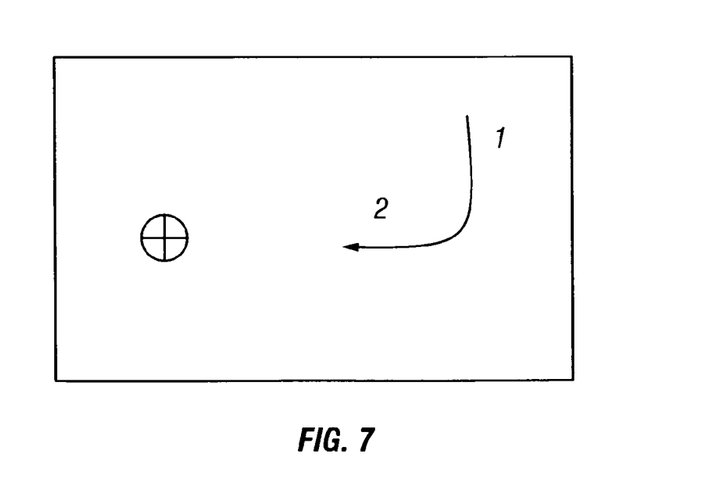
FIG. 7 is a top view of an illustrative path to a stationary target to get multiple SAR looks with tilt angle diversity useful in generating a 3D image of the target.

FIG. 7 is a top view of an illustrative flight trajectory comprising trajectories 1 and 2 and an intermediate turn therebetween to provide substantial tilt angle diversity between multiple SAR images according to the invention. Given an approximate location of a target, such a flight trajectory is easily planned. For a stationary target, one needs to change the angle between the velocity vector and LOS to get tilt angle diversity.

Figure 8:
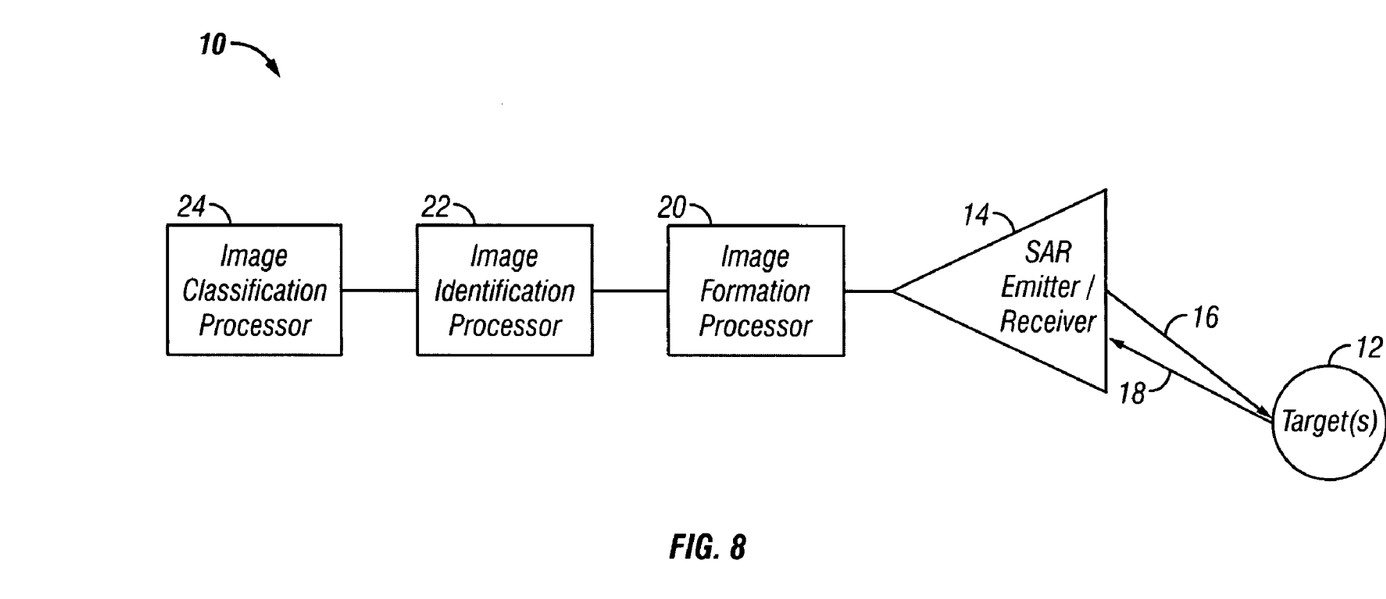
FIG. 8 is a block diagram of an apparatus according to the invention.

FIG. 8 illustrates the preferred apparatus 10 according to the invention. SAR emitter/receiver 14 emits electromagnetic radiation 16 (preferably millimeter wave (MMW) or X band, and most preferably MMW) and receives return signals 18 from one or more targets 12. The return signals are provided to image formation processor 20, which passes 2D SAR images to image identification processor 22, which passes target classifications to image classification processor 24, which generates a final target classification by fusing classifications from multiple SAR images of the target. As understood by one of ordinary skill in the art, apparatuses 20,22,24 can comprise a single piece of hardware (e.g., microprocessor, field programmable gate array (FPGA), digital image processor, etc.) running multiple software routines or processes, three discrete pieces of hardware, or a combination thereof, depending on desired cost and performance parameters. The SAR emitter/receiver preferably has beam steering agility and is combined with accurate navigation data from its platform (e.g., missile, aircraft, unmanned aerospace vehicle). MMW radars are preferred over X Band radars because the cross-range integration time requirement for MMW is shorter. This enables the MMW radar to create more images (at the same cross-range resolution) per unit time.

As understood by one of ordinary skill in the art, either the image formation processor or the image identification processor needs to geolocate the target or targets within each image so that the proper subset of the individual looks/images is processed. These algorithms are commonly known, implemented, and published and their precise method of accomplishment is not important to the present invention.

Figure 9:
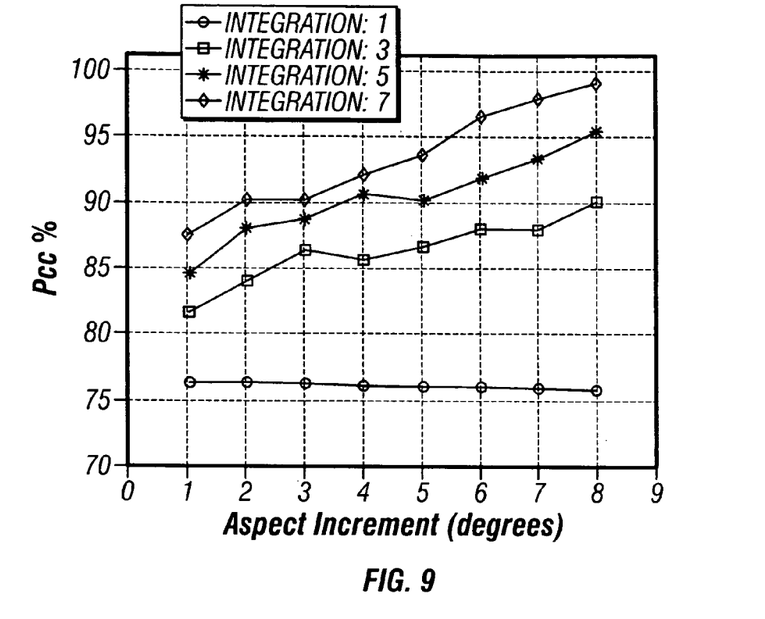
FIG. 9 is a graph illustrating improvements in correct target classification with multiple SAR looks at diverse aspect increments and using Bayes probabilistic combining.
Figure 10:
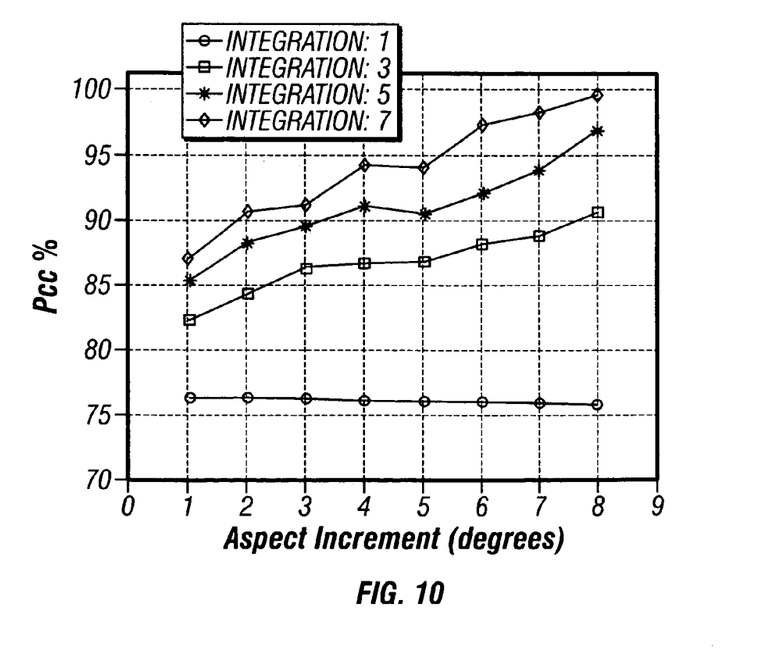
FIG. 10 is a graph illustrating improvements in correct target classification with multiple SAR looks at diverse aspect increments and using correlation plane peaks accumulation.

FIGS. 9 and 10 illustrate the significant improvement in correct automated target classification provided by the present invention. An image identification processor (9-class MACH-only classifier) was trained with X band MSTAR (Man-portable Surveillance and Target Acquisition Radar) targets at 17 degree elevation and X band ERADS (Expert Radar Signature Solutions project of the U.S. Army's National Ground Intelligence Center (NGIC)) targets at 20 degree elevation. FIG. 9 shows results from SAR images taken at 20 degrees elevation and employing an image classification processor employing a Bayes probabilistic combining technique to fuse results from multiple images. FIG. 10 is the equivalent only using a correlation plane peaks accumulation technique. A single SAR image provided to the processor resulted in about a 76% $P_{cc}$. Continual improvement is seen in $P_{cc}$ as the number of images integrated increases and as the aspect increment between images increases. In other words, integration gains the greatest $P_{cc}$ with total "span" (number of looks multiplied by the increment between looks) of all looks. With integration of seven images and an eight degree aspect increment, $P_{cc}$ was approximately 98%.

The present invention is useful because increased $P_{cc}$ in military situations will decrease fratricide and lead to quicker and more confident decisions. It further may allow for relaxed cross-range resolution requirements, thus decreasing sensor processing requirements. There is no need to form a single 3D image of the target (forming a radar 3D volume is a quite difficult process). The present invention is also useful in surveying, mapping, and creation of spatial databases, as well as in law enforcement and homeland defense surveillance systems.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An apparatus for employing synthetic aperture radar (SAR) images to automatically classify a target, said apparatus comprising:
    a SAR emitter and collector capable of operating at a plurality of squint angles;
    an image formation processor receiving data from said collector and forming a plurality of SAR images of the target, said plurality of SAR images substantially having tilt angle diversity;
    an image identification processor automatically classifying the target from each of said plurality of SAR images; and
    a target classification processor receiving classifications from said image identification processor and generating a most probable target classification from said received classifications.

2. The apparatus of claim 1 wherein the increment between tilt angles for successive SAR images can be at least approximately 1 degree.

3. The apparatus of claim 2 wherein the increment between tilt angles for successive SAR images can be at least approximately 8 degrees.

4. The apparatus of claim 3 wherein said plurality of SAR images can number at least seven.

5. The apparatus of claim 1 additionally comprising a flight platform carrying said SAR emitter and collector.

6. The apparatus of claim 5 wherein said flight platform is capable of performing at least approximately a 90 degree turn about a stationary target.

7. The apparatus of claim 1 wherein said SAR emitter and collector operates in one or more electromagnetic radiation bands selected from the group consisting of millimeter wave and X band.

8. The apparatus of claim 7 wherein said SAR emitter and collector operates in the millimeter wave electromagnetic radiation band.

9. The apparatus of claim 1 wherein said target classification processor employs a Bayes probabilistic combining technique.

10. The apparatus of claim 1 wherein said target classification processor employs a correlation plane peaks accumulation technique.

11. A method of employing synthetic aperture radar (SAR) images to automatically classify a target, the method comprising the steps of:
    emitting and collecting SAR signals at a plurality of squint angles;
    forming a plurality of SAR images of the target from the collected signals, the plurality of SAR images substantially having tilt angle diversity;
    automatically classifying the target from each of the plurality of SAR images; and
    generating a most probable target classification from the classifications of the plurality of SAR images.

12. The method of claim 11 wherein the increment between tilt angles for successive SAR images is at least approximately 1 degree.

13. The method of claim 12 wherein the increment between tilt angles for successive SAR images is at least approximately 8 degrees.

14. The method of claim 13 wherein the plurality of SAR images numbers at least seven.

15. The method of claim 11 wherein the emitting step comprises employing a flight platform carrying the SAR emitter and collector.

16. The method of claim 15 wherein the flight platform performs at least approximately a 90 degree turn about a stationary target during operation of the method.

17. The method of claim 11 wherein the SAR emitter and collector operates in one or more electromagnetic radiation bands selected from the group consisting of millimeter wave and X band.

18. The method of claim 17 wherein the SAR emitter and collector operates in the millimeter wave electromagnetic radiation band.

19. The method of claim 11 wherein the generating step comprises employing a Bayes probabilistic combining technique.

20. The method of claim 11 wherein the generating step comprises employing a correlation plane peaks accumulation technique.

* * * * *